(12) United States Patent
Baker et al.

(10) Patent No.: US 12,062,281 B1
(45) Date of Patent: Aug. 13, 2024

(54) ROADWAY SIGHT RESTRICTION EARLY WARNING ALARM SYSTEM

(71) Applicants: John Gregory Baker, Plano, TX (US); Victor Nicholas Pavloff, Jr., Cross Roads, TX (US); Scott Alan Brush, Dallas, TX (US)

(72) Inventors: John Gregory Baker, Plano, TX (US); Victor Nicholas Pavloff, Jr., Cross Roads, TX (US); Scott Alan Brush, Dallas, TX (US)

(*) Notice: Subject to any disclaimer, the term of this patent is extended or adjusted under 35 U.S.C. 154(b) by 47 days.

(21) Appl. No.: 17/734,328

(22) Filed: May 2, 2022

(51) Int. Cl.
| | |
|---|---|
| *G08G 1/09* | (2006.01) |
| *B64C 39/02* | (2023.01) |
| *G06V 10/82* | (2022.01) |
| *G06V 20/54* | (2022.01) |
| *G08G 1/01* | (2006.01) |
| *G08G 1/16* | (2006.01) |
| *H04W 4/90* | (2018.01) |
| *B64U 101/00* | (2023.01) |

(52) U.S. Cl.
CPC .......... *G08G 1/091* (2013.01); *B64C 39/024* (2013.01); *G06V 10/82* (2022.01); *G06V 20/54* (2022.01); *G08G 1/0116* (2013.01); *G08G 1/0133* (2013.01); *G08G 1/0145* (2013.01); *G08G 1/164* (2013.01); *G08G 1/166* (2013.01); *H04W 4/90* (2018.02); *B64U 2101/00* (2023.01); *G06V 2201/08* (2022.01)

(58) Field of Classification Search
CPC ......... H04W 4/90; G06V 20/54; G06V 10/82; G06V 2201/08; B64C 39/024; G08G 1/091; G08G 1/0116; G08G 1/0133; G08G 1/0145; G08G 1/164; G08G 1/166; B64U 2101/00
See application file for complete search history.

(56) References Cited

U.S. PATENT DOCUMENTS

| | | | |
|---|---|---|---|
| 6,317,058 B1* | 11/2001 | Lemelson ............. | G08G 1/087 340/905 |
| 9,076,332 B2* | 7/2015 | Myr ........................ | G08G 1/04 |
| 2016/0293003 A1* | 10/2016 | Ng ........................ | G08G 1/0141 |
| 2019/0197890 A1* | 6/2019 | Du ........................ | G08G 1/012 |
| 2022/0126863 A1* | 4/2022 | Moustafa ................. | G06T 9/00 |
| 2022/0148417 A1* | 5/2022 | Hu .......................... | G08G 1/07 |

* cited by examiner

*Primary Examiner* — Sisay Yacob
(74) *Attorney, Agent, or Firm* — BAKER LAW FIRM; John Baker; Jeffrey Roddy

(57) ABSTRACT

A traffic obstruction early warning system installed in roadway locations with limited visibility or restricted line of sight to warn drivers approaching a hazardous road condition well in advance so that precautionary measures may be taken and thereby reduce the risk of the multiple vehicle involvement. Selected roadway locations for the system installations can be the location of past vehicle pile-ups, or at-risk locations. The system timely and cohesively integrates inputs from a plurality of roadway sensors and human reporting to deploy a variety of visible and audible alerts to approaching drivers, law enforcement, emergency responders, local hospitals, utility companies, vehicle apps, and others using a variety of communication modalities.

15 Claims, 16 Drawing Sheets

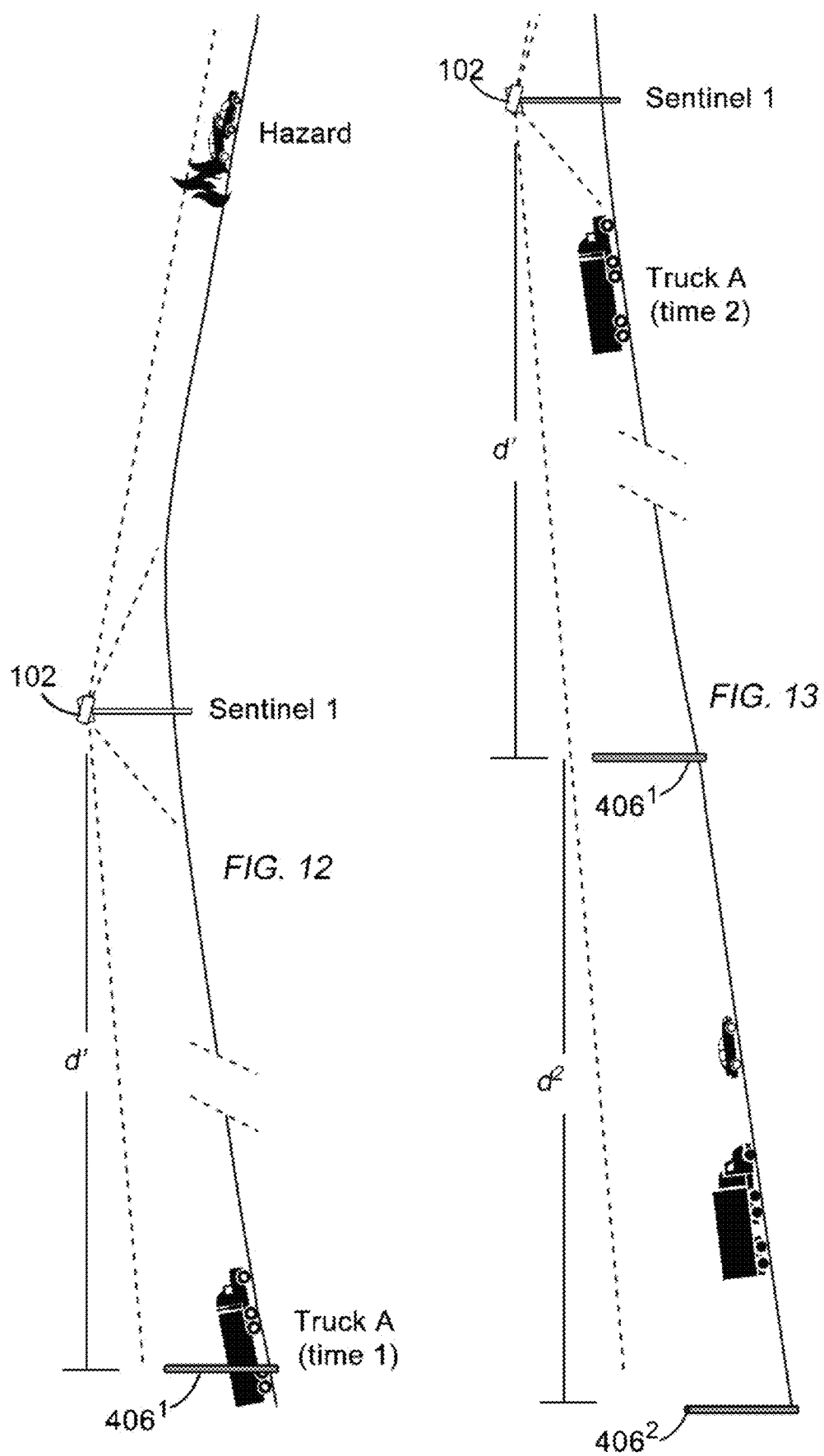

ROADWAY SIGHT RESTRICTION EARLY WARNING ALARM SYSTEM

FIELD OF THE INVENTION

The invention relates to a Roadway Sight Restriction Early Warning Alarm System in which access and traffic flow to a particular highway area needs to be restricted and approaching drivers warned due to safety concerns; for example, warning approaching drivers to the dangers of a multi-vehicle pileups ahead.

BACKGROUND OF THE INVENTION

Currently there is not an adequate emergency early warning roadway system solution which can rapidly notify approaching drivers when there is a road hazard out of sight distance, for example, over a rise in the road, and even more critically when the accident involves a growing multiple car pileup. Lack of an adequate early multiple vehicle pile-up warning system solution results in a high number of yearly deaths, injuries and staggering economic costs.

There were about 16,839 multi-vehicle deaths in 2019. 47% of the deaths were multi-vehicle. A single pile up in North Texas involved 133 vehicles resulting in six dead and more than 67 people were treated at area hospitals for injuries related to the crash. Nationwide, incidents such as these result in substantial cost in injuries, lost time and damage to property that negatively impacts hospitals, emergency responders, transportation agencies and municipalities, and services to support clean up and repair efforts.

In vehicular pile-ups emergency response vehicles have to arrive on site and attempt to get within the sight distance of approaching traffic, e.g., top of a hill, to warn the approaching roadway users. Often, by this time, multiple vehicles are involved. An adequate emergency early warning roadway system solution is lacking.

Roadways are designed and constructed based on a route alignment which determines where a roadway will get constructed. When viewed in a plan drawing, the route seems simple enough. In reality, roadways are not straight for their entire length, they curve to the right or to the left. This type of curve is known as the "horizontal alignment." In a similar way, roadways are not flat for their entire length. Roadways traverse over hills and down valleys. Consider where two roadways intersect and one is constructed such that it goes over the top of the other. These hills and dips are known as the roadway's "vertical alignment" or vertical profile.

Design standards exist which guide or govern how roadway and highway design engineers layout the horizontal and vertical alignment of a roadway. This allows for the roadway user to experience subtle turns and vertical profiles that will be safely navigable. Straying from established design standards may result in a hill that crests abruptly, potentially launching a vehicle.

Although Engineers design roadways for safe travel by drivers, certain conditions frequently encountered are inherent and unavoidable. One such condition occurs with regards to "sight distance" which refers to the driver's ability to see down the roadway. Sight distance applies to different roadway aspects such as at intersections or passing sight distances. Applied to the description herein, it refers to a drivers ability to see down the roadway when they approach a vertical curve, e.g., a hill, a narrow lane, or a tight horizontal curve in the roadway, e.g., a tight, mountainous roadway curve.

Due to real world constraints it may be impossible to design and construct an alignment that allows for the best sight distances to drivers. When incidents occur within the vicinity of limited sight distance sections of roadway, e.g., immediately past the crest of an overpass or hill, conditions could exist that make the incident hazardous for drivers advancing on the incident and unaware of the situation and possibly result in multiple vehicle incidents or a pile up. With each successive vehicle's inclusion into the incident, the ability of other approaching drivers to react and avoid the hazard decreases.

Accordingly, it would be desirable to provide a system capable of signaling immediate notification of a incident to approaching drivers.

It would be further desirable if such a system were capable of multiple operational modes to provide on or more early alerts; whether visual or audio, to approaching drivers.

Motivation for the Invention

Emotionally moved by his experience in responding personally to many fatal multi-vehicle pile-ups, one of the inventors previously employed as a district engineer with a State Department of Transportation, was motivated to develop the present invention. Should the US Department of Transportation find usefulness in the invention, the inventors are willing to work with the United States Department of Transportation's Federal Highway Administration to assist in the deployment of various implementations described herein, and to contribute even further in the development of same.

SUMMARY OF THE INVENTION

One general example implementation of a highway sight restriction early warning alarm system includes one or more sensors configured to communicate with one or more signals which are visible or to approaching drivers.

In an aspect in combination with the foregoing implementation, the system may include one or more signals that are audible.

In an aspect combinable with any other aspect, the system may include alerts that trigger in cascading order depending on the severity of a traffic incident.

In an aspect combinable with any other aspect, the system may include elevated signage at a distance prior to a sight restricted stretch of roadway; e.g., low visibility preceding a rise in the roadway, sudden over-rise grade changes, blind curves or abrupt changes in direction.

In an aspect combinable with any other aspect, the system may include one or more elevated cameras.

In an aspect combinable with any other aspect, the system may include one or more radio transmitters in communication with the one or more cameras.

In an aspect combinable with any other aspect, the system may include one or more automated sirens.

In an aspect combinable with any other aspect, the system may include one or more automated lights capable of flashing.

In an aspect combinable with any other aspect, the system may include an automated radio transmission to one or more public radio bands.

In an aspect combinable with any other aspect, the system may include an automated notification to selected radio stations to issue an alert.

In an aspect combinable with any other aspect, the system may include one or more aerial drones.

In an aspect combinable with any other aspect, the system may include one or more projectors configured to project a warning; e.g., symbols, words, or a combination thereof, against a surface.

In an aspect combinable with any other aspect, the system may include one or more radio transmissions adapted to communicate with a smart vehicle.

In an aspect combinable with any other aspect, the system may include one or more incoming or outgoing satellite radio transmissions.

The invention is a system to provide immediate advanced notification of road hazard to approaching sight restricted drivers. The invention utilizes technology to activate multiple devices intended to capture the attention of users and thereby alert them to proceed with caution. In various aspects combinable with any other aspect, it is possible that alerts may be transmitted to OEM and aftermarket devices installed on vehicles, smart vehicle technology, mobile device applications, drones, projectors for emitting cautionary messaging, vehicular governing devices, and flashing lights and signage.

Best mode of the system is to deploy it at any sites where there have been previous pileups, and cases where road analysis has determined a higher probability of future pileups.

Benefits

Benefits of the highway sight restriction early warning alarm system include: reduced vehicle pileup, lives saved, vehicle property saved, personal property saved, municipal property saved, insurance money saved, insurance rates potentially lower, tax money saved, court dockets reduced and faster response times for emergency responders.

BRIEF DESCRIPTION OF DRAWING FIGURES

The patent or application file contains at least one drawing executed in color. Copies of this patent or patent application publication with color drawing(s) will be provided by the Office upon request and payment of the necessary fee.

Figure 14:
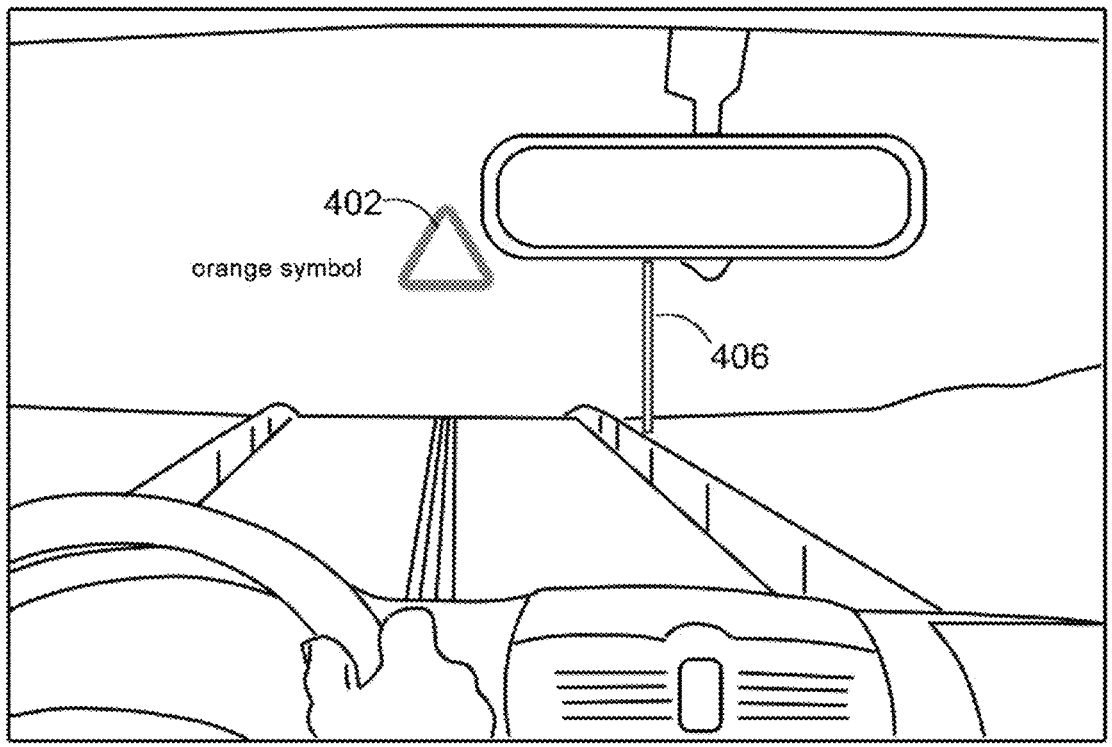
Figure 15:
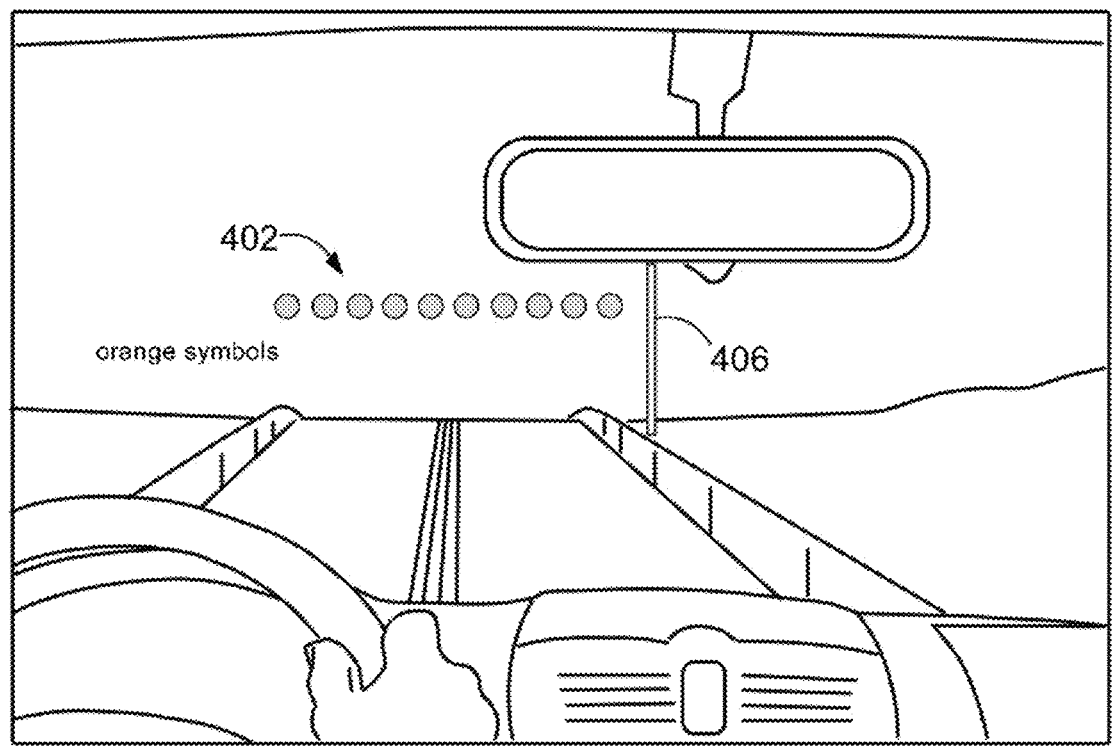
Figure 16:
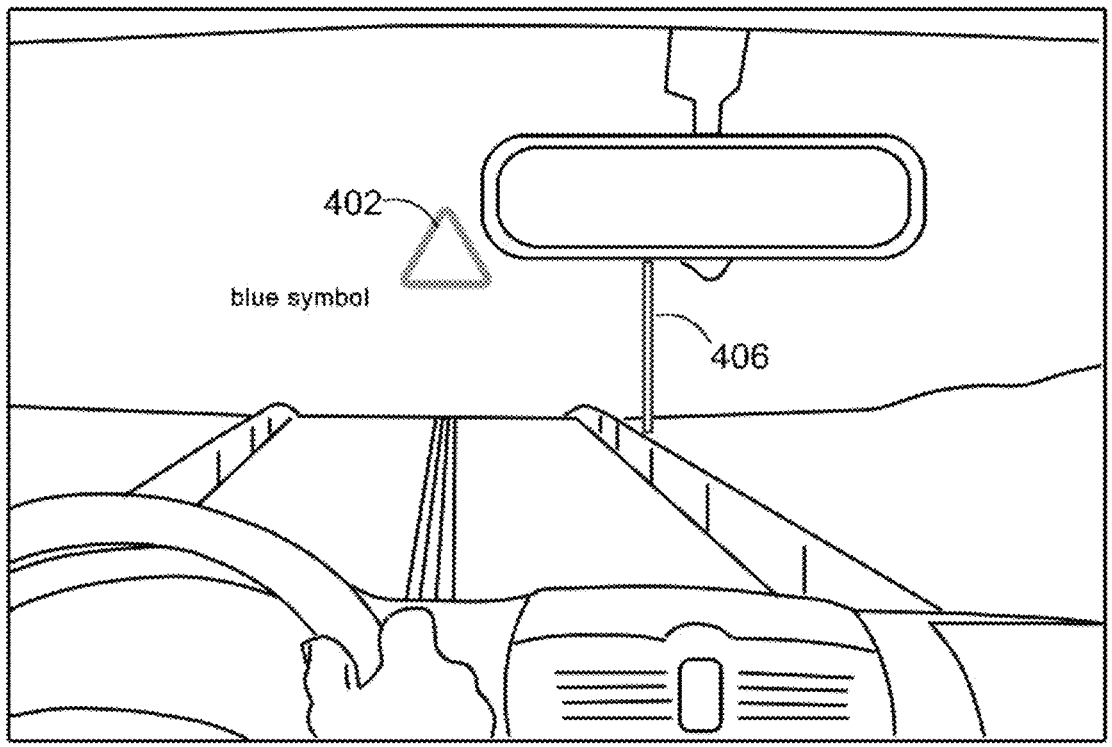
Figure 17:
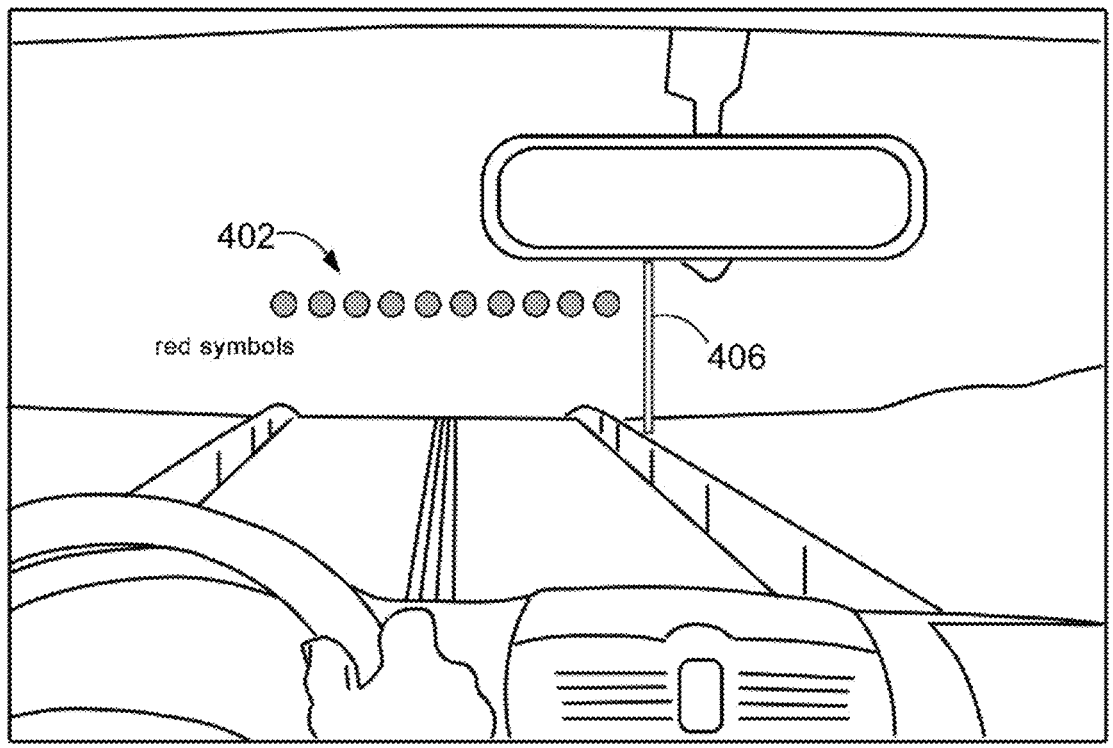
Figure 18:
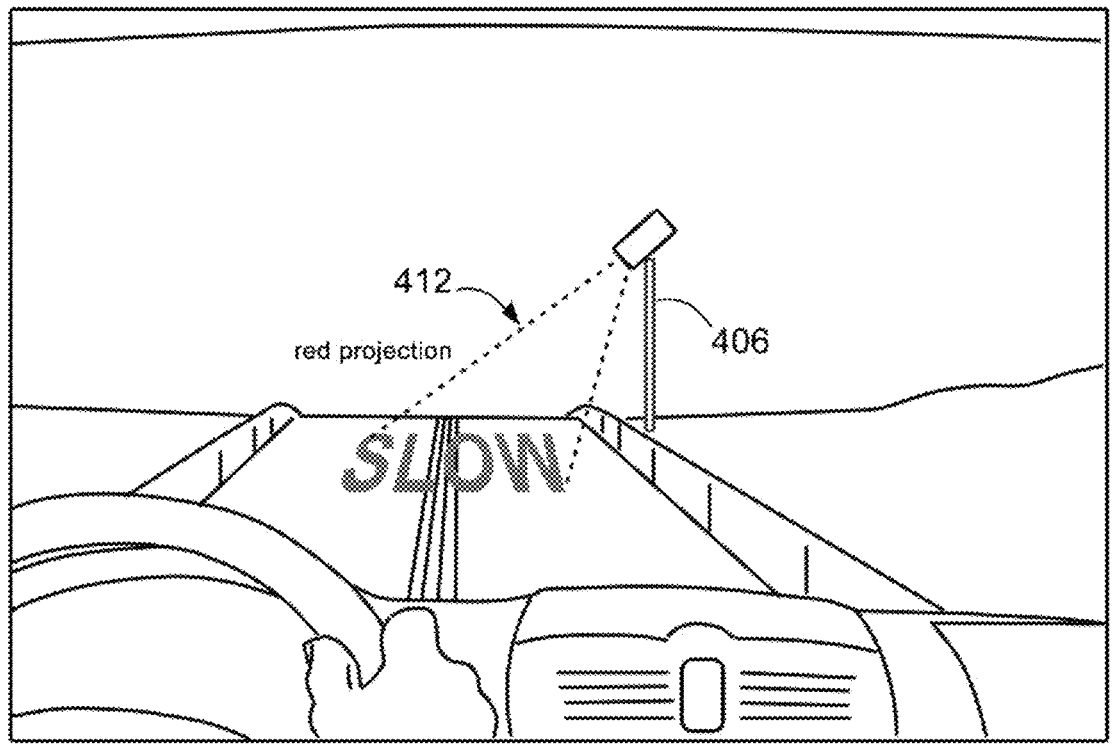
Figure 19:
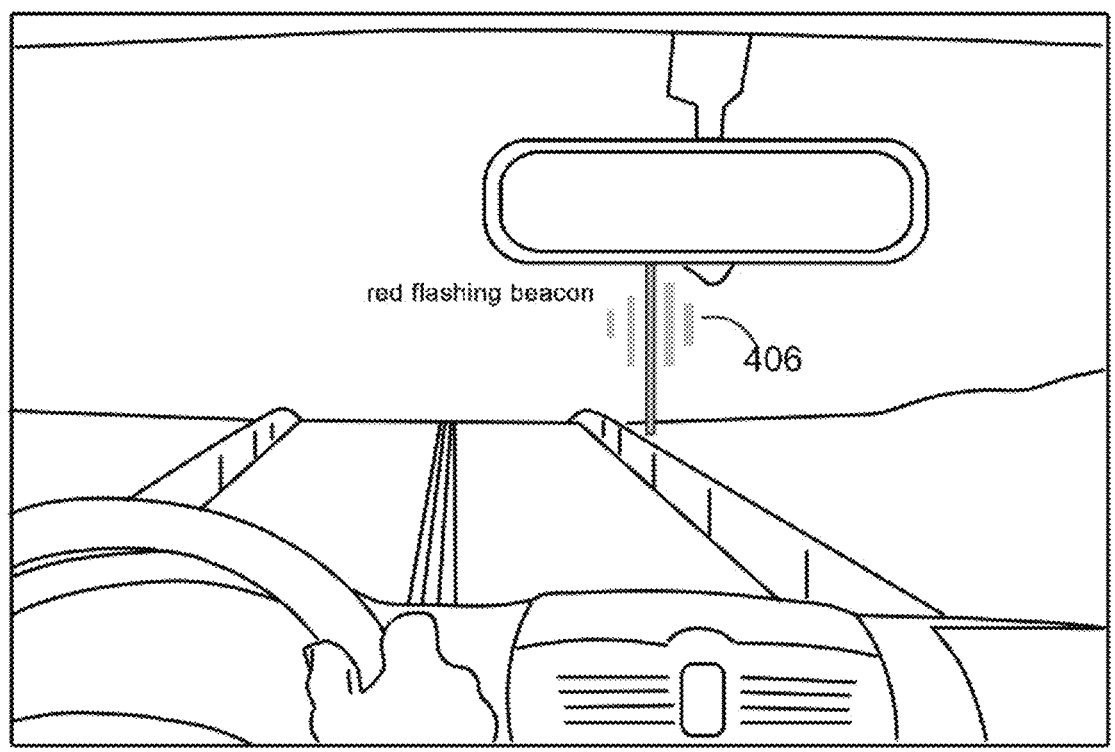
Figure 20:
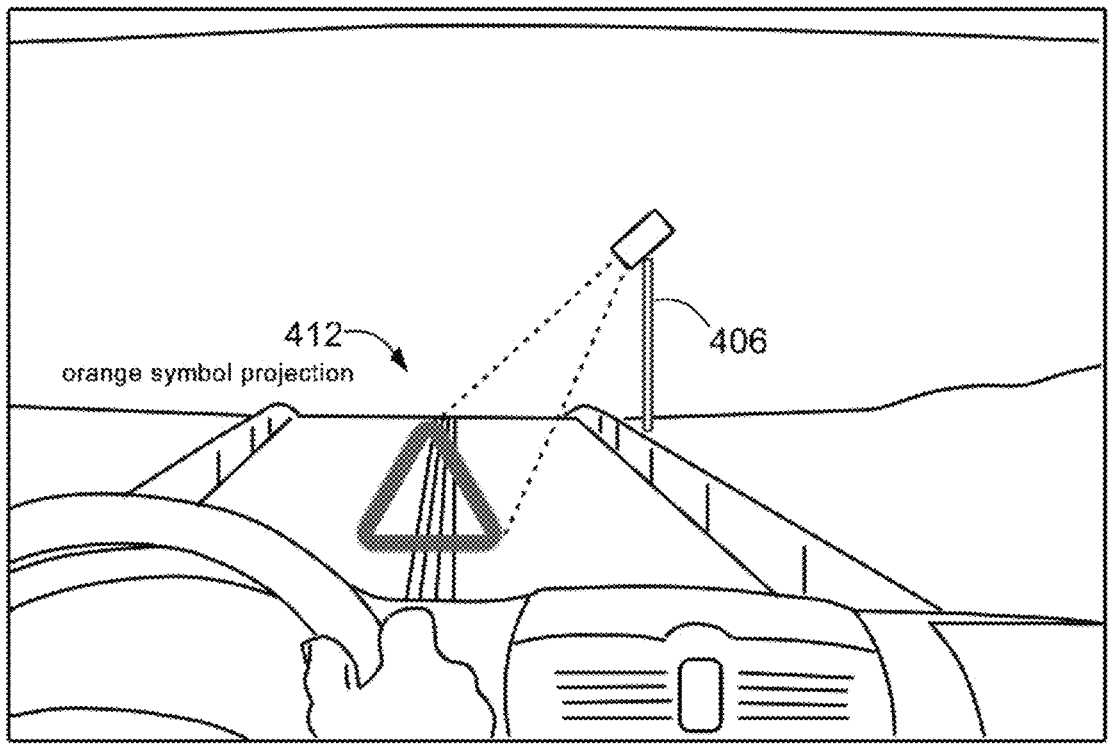
Figure 21:
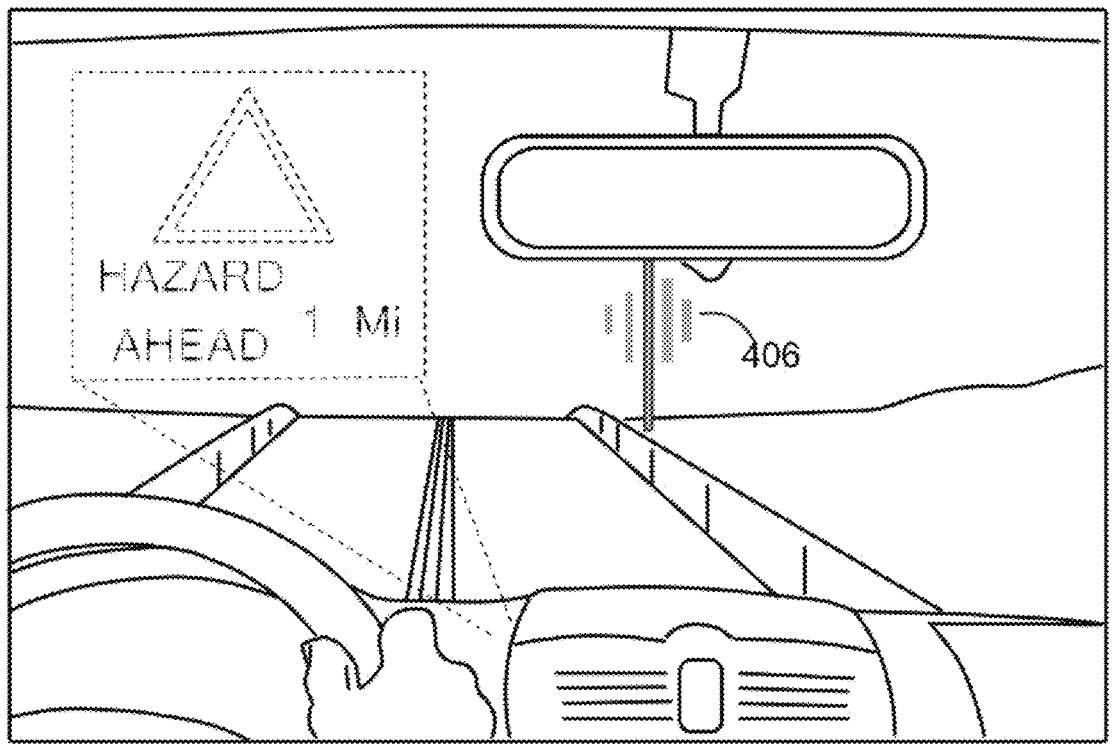
Figure 22:
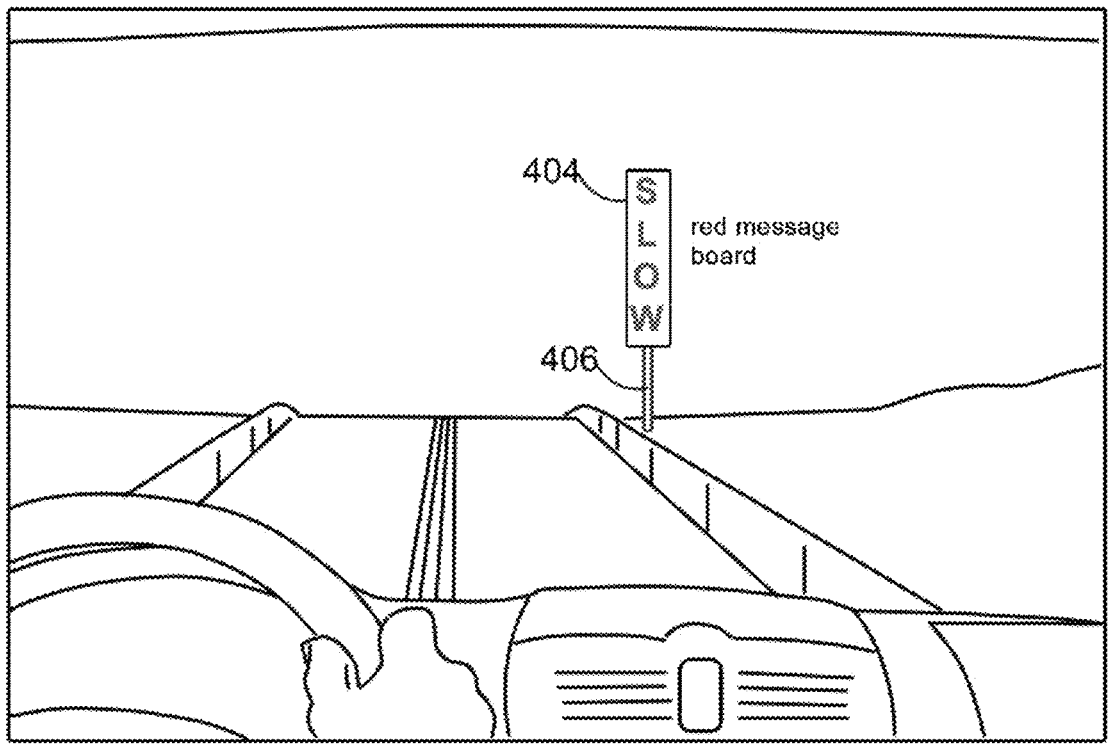
Figure 23:
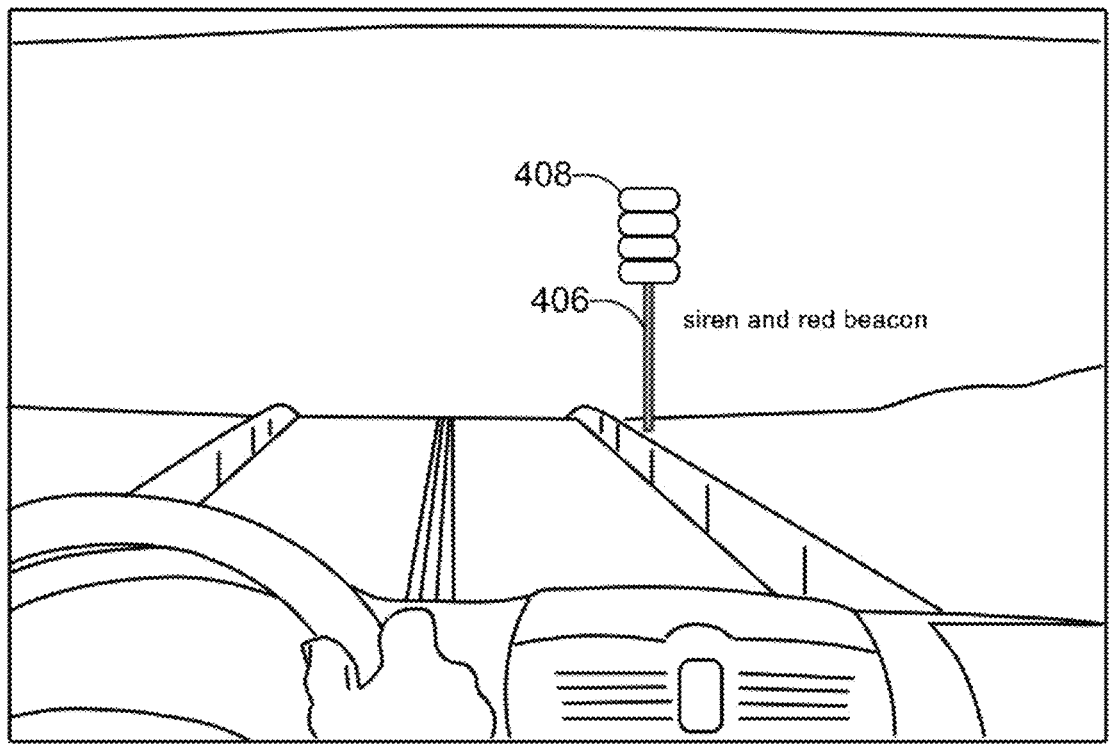
Figure 24:
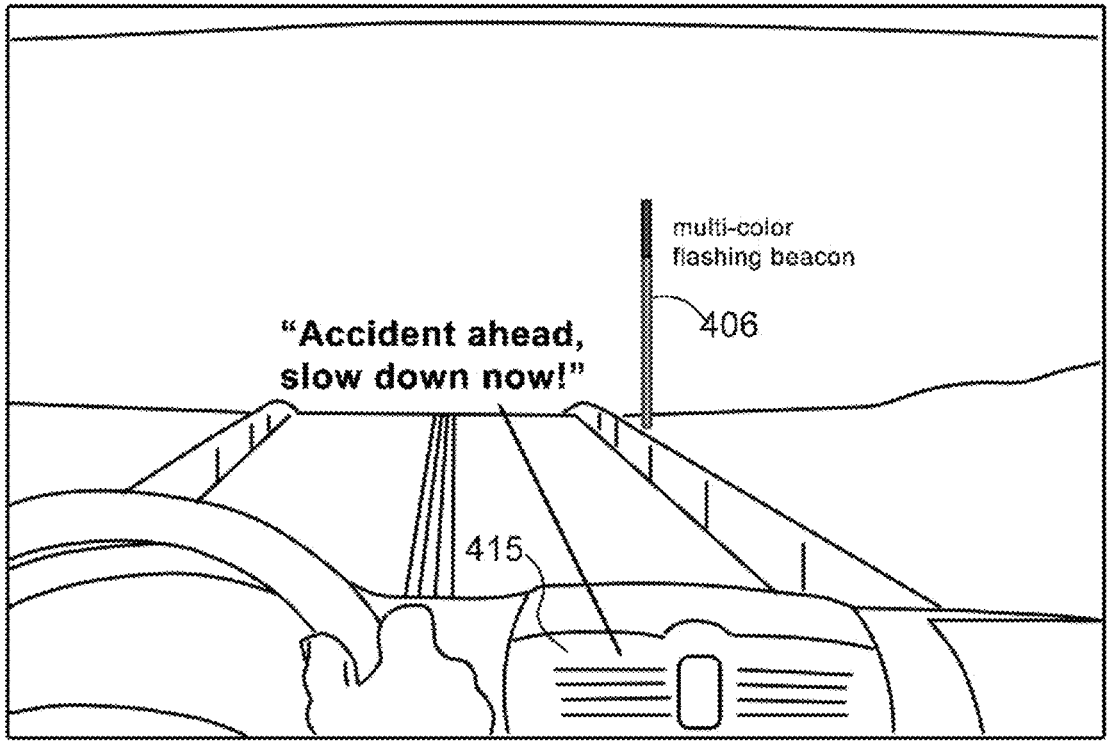
Figure 25:
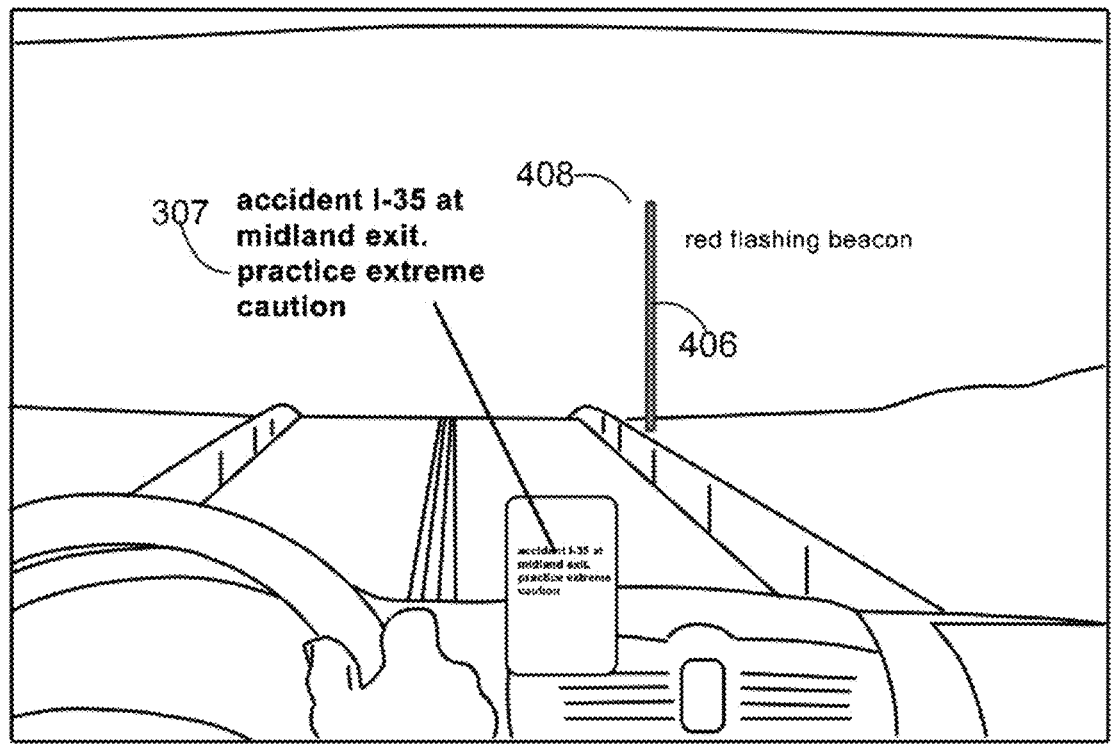
Figure 26:
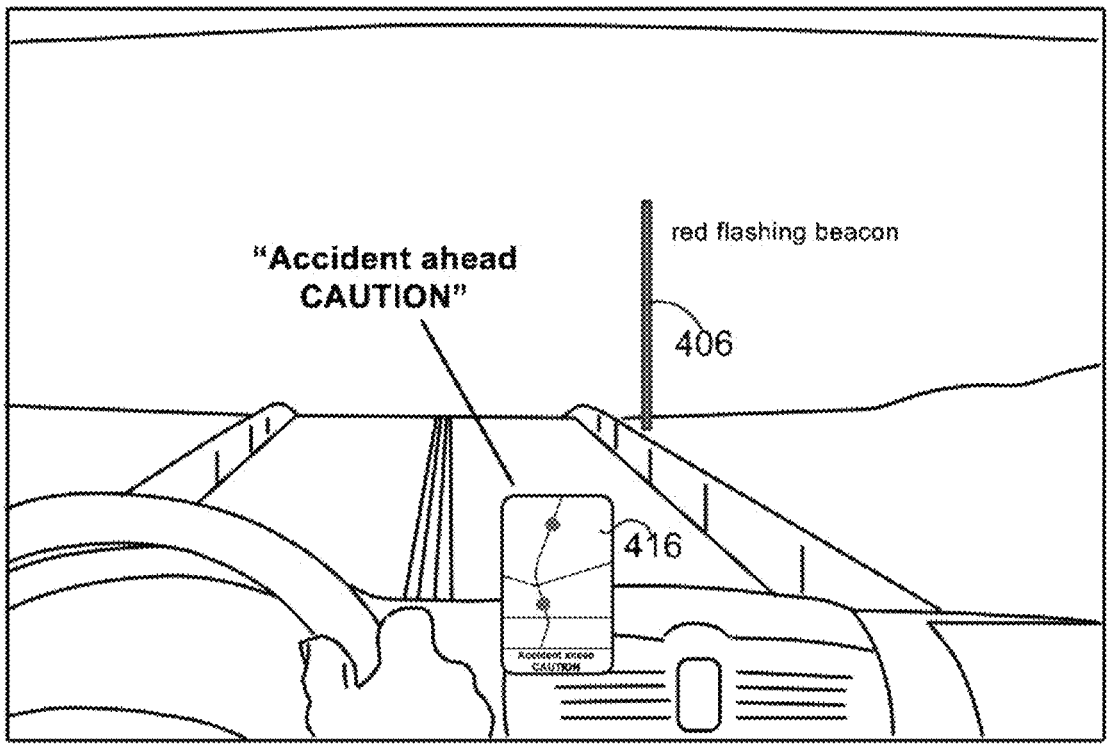

FIGS. 12 and 13 in diagrammatic views illustrate a developing hazard over time and an example hazard response notification according to various implementations of the present invention;

FIG. 14 in a through-windshield view, shows a drone group; e.g., multiple drones flying in an color associated triangular formation to signal a roadway hazard to approaching drivers prior to a view obstructed section of a roadway; e.g., blue for ice, orange for construction zone and red for hazard;

FIG. 15 in a through-windshield view, shows a drone group; e.g., multiple drones flying in a row formation to signal a roadway hazard to approaching drivers prior to a view obstructed section of a roadway:

FIG. 16 in a through-windshield view, shows a drone group; e.g., multiple drones flying in blue triangular formation to signal an ice hazard to approaching drivers prior to a view obstructed section of a roadway;

FIG. 17 in a through-windshield view, shows a drone group; e.g., multiple drones fitted with red lights and flying in a row formation to signal a severe roadway hazard to approaching drivers prior to a view obstructed section of a roadway;

FIG. 18 in a through-windshield view, showing a roadway surface projection forming a caution; instruction to slow speed warning prior to a view obstructed section of a roadway;

FIG. 19 in a through-windshield view, shows a flashing lighted beacon at the side of a roadway prior to a view obstructed section of a roadway;

FIG. 20 in a through-windshield view, showing a triangular warning sign projected on the roadway prior to a view obstructed section of a roadway;

FIG. 21 shows a heads-up display projected on windshield glass including a hazard warning and a flashing beacon at the side of a roadway prior to a view obstructed section of a roadway;

FIG. 22 in a through-windshield view, shows an adaptable message board blinking "slow" prior to a view obstructed section of a roadway;

FIG. 23 in a through-windshield view, shows a audible siren-beacon at the side of a roadway prior to a view obstructed section of a roadway;

FIG. 24 in a through-windshield view, shows a two color flashing beacon at the side of a roadway prior to a view obstructed section of a roadway and a audio warning transmission to a vehicle radio;

FIG. 25 in a through-windshield view, shows a lighted beacon at the side of a roadway prior to a rise in a roadway and a wireless emergency alert (307) made to a mobile device;

FIG. 26 in a through-windshield view, shows a lighted beacon at the side of a roadway prior to a rise in a roadway and an alert sent to an approaching driver through a smartphone road navigation application or integrated vehicle navigation system.

Figure 27:
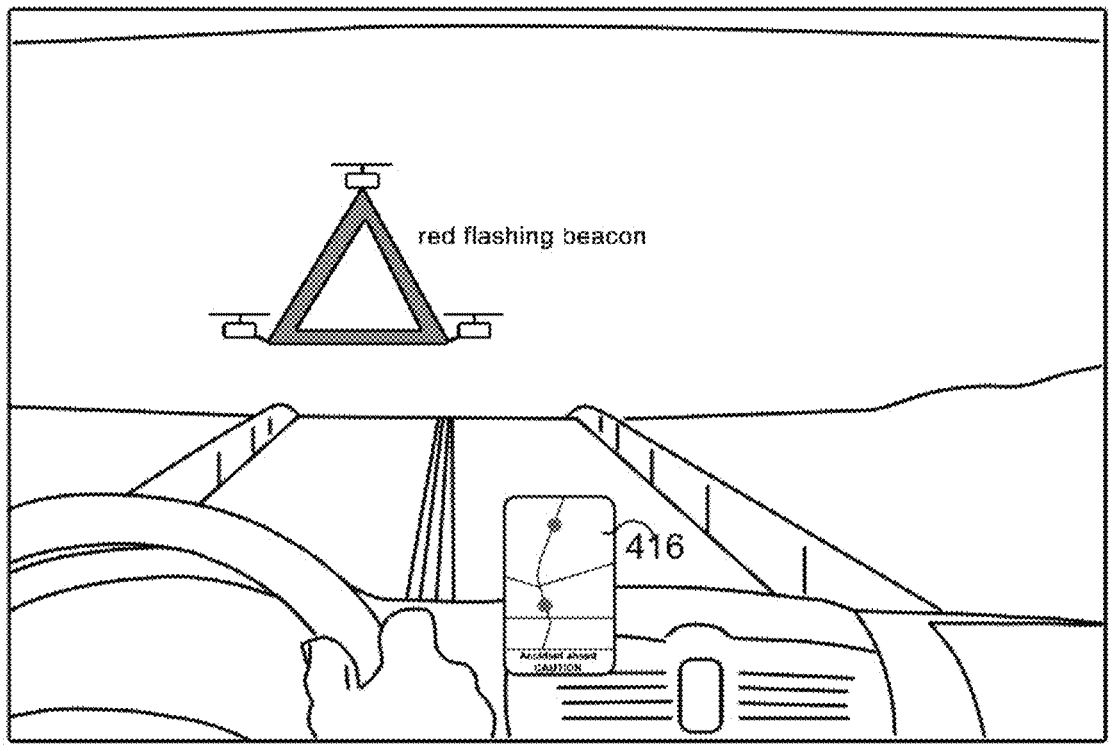

FIG. 27 shows a pair of drones elevating a lighted symbol/sign, instead of flying in formation to form an outline of the symbol (e.g., FIGS. 14, 16), to indicate a hazard ahead.

REFERENCE LIST OF THE NAMED ELEMENTS

100 highway sight restriction early warning alarm system
101 alarm initiators
102 camera
103 pixel freeze monitoring
104 fire, heat or smoke detection sensors
105 infrared sensor
106 road crash sensors 108 motion detection sensors
110 proximity sensors
130 live reporting
131 accident reports from driver applications
132 anonymous call in
134 integrated vehicle software
136 on-site panic button
138 satellite
140 emergency responder
200 master control module
201 risk assessment score data
202 Artificial Intelligence Module
300 alarm activator module
301 local fire department/hazmat alert
302 ambulance alert
304 radio station alert
306 public band alert
307 wireless emergency alert
308 medical providers alert
310 utility company alert (e.g., gas, electric)
312 freight trucks alert
313 chemical tanker alert
314 mass transport alert, e.g., bus lines
316 school transport alert
400 visual or audible signals
402 aerial drone
404 signage, message board(s)
406 beacon
408 siren
410 speaker
412 projection
414 laser display
415 car radio
416 mobile device

DETAILED DESCRIPTION

Definitions

The term "alert" means a notification via a visible signal such as a flashing roadside beacon or an audible siren or loudspeaker and alerts that are transmitted via radio, e.g., public band, wireless emergency alert system, WiFi, etc. Generally, alerts may be divided into two categories: alerts that are recipient-agnostic, e.g., a flashing roadside beacon or an aerial drone display that all drivers approaching a hazard may see, wireless emergency alerts such as tornado alerts sent to all cell phones in the area, or alerts that are recipient-specific, e.g. automated radio or telephonic alerts sent to recipients such as a local school district, local fire department/hazmat response team, highway patrol, local hospital or shipping line company. Accordingly, the term alert is intended to include multiple methods for notifying all potentially affected parties of a road hazard. The term "camera" refers to any component that includes an imaging sensor and may include other components that process a video stream in real time. The term "process" means a rules driven sequence of actions, some of which is automated through programming. "Module" as used herein means part of a program that encapsulates code and data to implement a particular functionality, a process, and includes one or more interfaces that let clients or other modules access its functionality. The terms "trigger" and "input" may be interchangeable according to the context. Unless otherwise explained, any technical terms used herein have the same meaning as commonly understood by one of ordinary skill in the art to which this disclosure belongs. The term "deep neural network" (DNN) is an artificial neural network with multiple layers between the input and output layers. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting. Portions and features of some implementations may be included in, or substituted for, those of other implementations. Implementations set forth in the claims encompass all available equivalents of those claims.

Figure 1:
FIG. 1 is a photograph showing a roadway hill crest from the point of view of drivers.
Figure 2:
FIG. 2 is a photograph showing a roadway blind curve.
Figure 3:
FIG. 3 is a photograph showing a pile up with icy conditions.
Figure 4:
FIG. 4 is another image showing icy conditions and a resulting vehicle pile-up.
Figure 5:
FIG. 5 shows an icy corridor and a pile up involving multiple tractor trailers.

Referring generally to photographs 1-6, selected from actual events, vehicular accidents and pile ups are shown under various road conditions. FIG. 1 shows a typical sight restricted condition for vehicles approaching a rise in a roadway. FIG. 2 shows a highway with a sharp curve where relatively fast speeds prior to entering the curve can lead to catastrophic accidents. FIGS. 3-6 shows an accident occurring with icy conditions.

Figure 6:
FIG. 6 shows a pile up on an iced-over access ramp.

Specifically, FIG. 6 shows an iced over bridge ramp and resulting pile up. Limited field of view and restricted sight distance often contribute to such accidents. The following implementations according to the present invention described in detail are intended to utilize multiple inputs including electronic sensors, human reporting and historical records that in aggregate indicate a hazardous roadway condition in order to alert approaching drivers prior to their encountering the roadway hazard.

Figure 7:
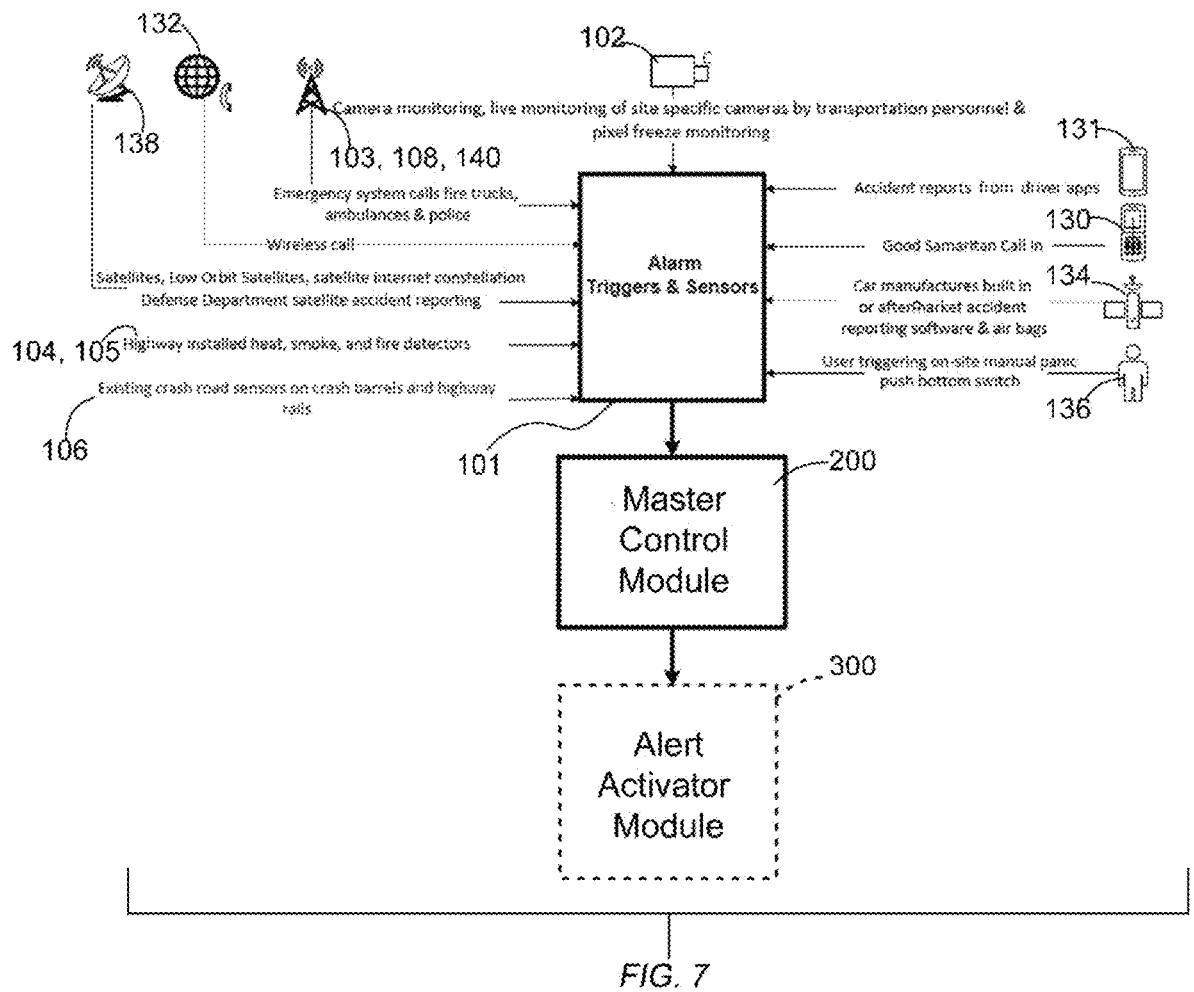
FIG. 7 is a generalized diagram showing various elements of a highway sight restriction early warning alarm system according to the present invention.

FIG. 7 is a high level diagrammatic view showing various modules of the system that include an alarm initiator module (101) that may include inputs from one or more cameras (102) trained on a section of roadway and employing motion and object recognition software, call-in notifications made by first responders (103, 108, 140), call-ins made by good Samaritans (130), accident reports by driver applications (131) such as Waze®, roadside panic buttons (136), local roadway sensors such as heat, smoke, fire detection, impact sensors (104, 105, 106), smart car systems (134) and satellite data (138). Alarm initiator module (trigger input) (101), master control module (processing) (200) and alert activator module (activating and alerting) (300) may be physically separated computerized modules, represent programmed functions within a single computing environment or otherwise suitably configured as will be appreciated by those skilled in the art. License recognition and logging capabilities using cameras and alphanumeric recognition software are known in the art and used extensively in tollway applications and other public transportation applications. By way of example, a camera (102) may be mounted to a tower or pole overlooking a roadway section known for or at risk for accidents. Camera (102) includes a video mode and a single board computer such as an NVIDIA® jetson series board, e.g., Jetson TX2i, or similar chipset with AI capability and shape and motion recognition software. When a traffic accident is sensed by the camera or reported by a person or other means, real time information regarding the scale, number and types of involved vehicles and whether there are fires, icy conditions, spilled cargo or a chemical spill is sent to the master control module (200) which determines an appropriate alert response according to the real time information from the camera and then transmits instructions to the alert activator module (300) which includes a multiplicity of cellular radio transmitters for one or more carriers, and telephony to both transmit recipient-agnostic and recipient-specific alerts. Depending on the severity of the hazard, a different code may be assigned. For example, icy conditions on a problem prone stretch of highway may mean signaling approaching drivers with blue flashing beacons to slow down while a vehicle pile-up may be yellow, orange or red. Typically flashing beacons (406) and adaptable signage (404), or message boards allow messages may be changed as on the fly to warn about specific hazards, e.g., "stop," "pull over," "slow—icy road ahead," "slow—hazardous spill ahead," "slow—jackknifed trailer;" also, roadside projection devices (412), elevated sirens (408), one or more aerial drones with flashing lights (402), laser displays (414) and other recipient-agnostic signaling means include transceivers that communicate with the alert activator module (300) via wired or wireless network. Likewise, the alert activator employs telephony to transmit to call centers, notify local radio station(s) to issue on-air alerts, notify the fire department and highway patrol of hazardous conditions.

Technology

Telephonic means to transmit recipient-specific alerts may include one or more cellular modems and routers; e.g., LTE CAT 6/CAT 3/CAT 1/CAT M1/NB-IoT, with 4G or 5G, the ability to use various carriers, and one or more remotely updateable data tables containing critical contacts for recipients. Databases suitable for contact number storage for the present invention may be, but are not limited to: postgres, mysql, Oracle, Mssql, Cassandra, Riak, Redis, and document-oriented databases such as BaseX, Cloudant, MongoDB. Shape and pattern recognition deep neural networks for traffic detection such as 4K Tensorflow SSD Inception v2 COCO are known in the art and are suitable for use with cameras and the Jetson TX2i and may be trained to recognize objects that are indicative of a vehicular accident. For example, given stretch of roadway, the ability to recognize the front of vehicles and whether or not any vehicles are moving or stopped facing the wrong direction, the ability to recognize fire, the ability to differentiate vehicles stopped on a shoulder vs in traffic and recognition of human beings standing or collapsed in the roadway are all teachable to shape recognition neural networks and when coupled with conditional logic can quickly ascertain the type and extent of a traffic disruption.

Figure 8:
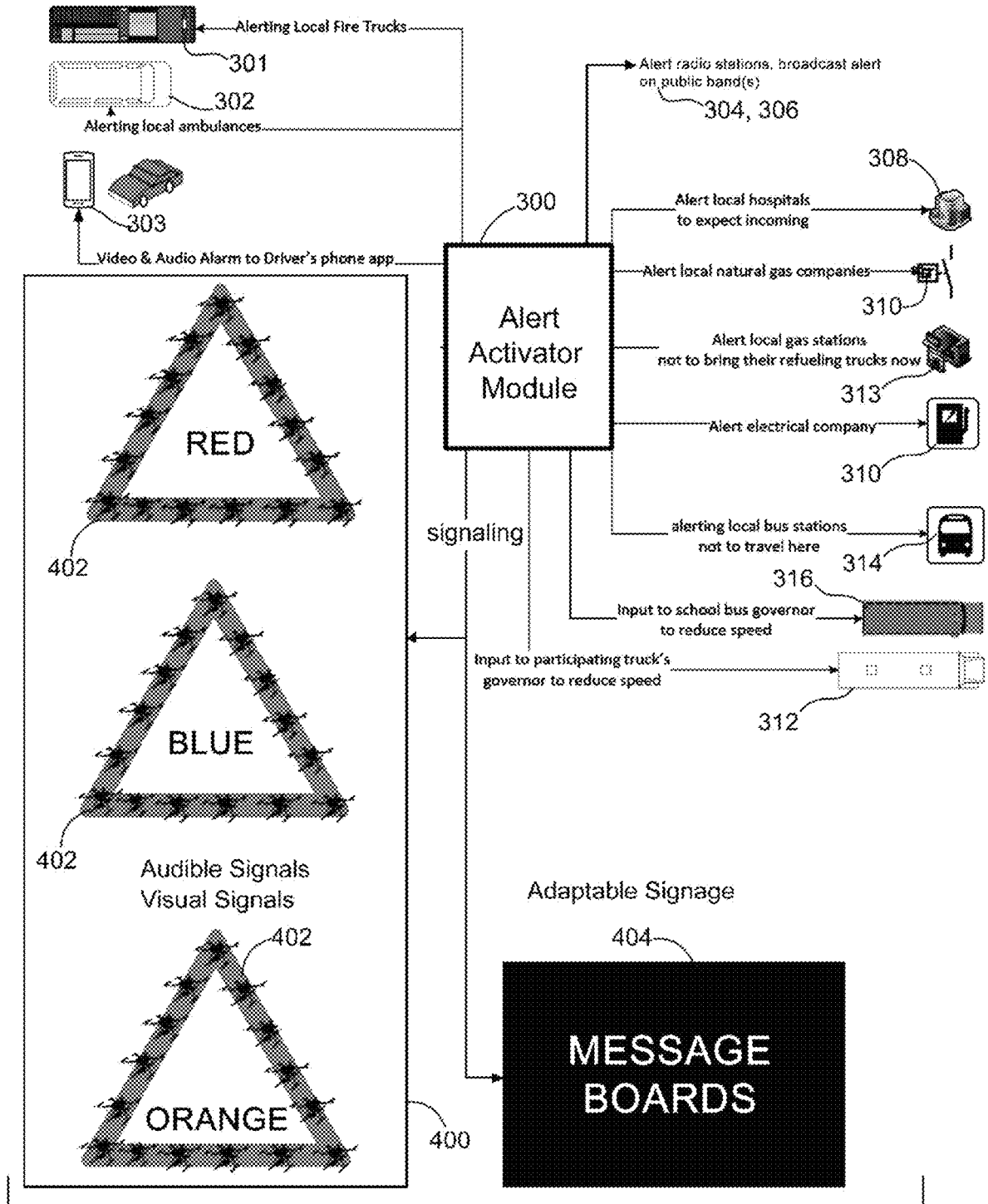
FIG. 8 is another general diagram showing various elements of a highway sight restriction early warning alarm system according to the present invention.

Moving to FIG. 8, inputs from the foregoing alerting/reporting sources are evaluated by the master control module (200) which uses programmable logic to corroborate the hazard report e.g., reports from sensor indicating a fire in the roadway, good Samaritan call in, etc. and sends instructions to the alert activator module (300) which activates audible or visual signals (400) which are displayed to drivers approaching the hazard. In other words, the warning signal may conceivably be located at a distance prior to or beyond 0.25 to 2 miles from the location of the sensed or reported road hazard in order to warn drivers well in advance. Signaling means may be selected from the following types: illuminated beacons with solid or flashing lights of one or more colors (406), programmable lighted roadway signage (404), sirens (408), speakers (410), projections onto a roadway surface (412), and aerial drones (402) which may hover above the roadway at some distance from the accident in a formation such as a triangle or other shape with solid or flashing lights. Such drones may leverage aerial display software such as Drone Show Software by SPH Engineering or Skymagic which enable aerial formations by multiple drones.

Figure 9:
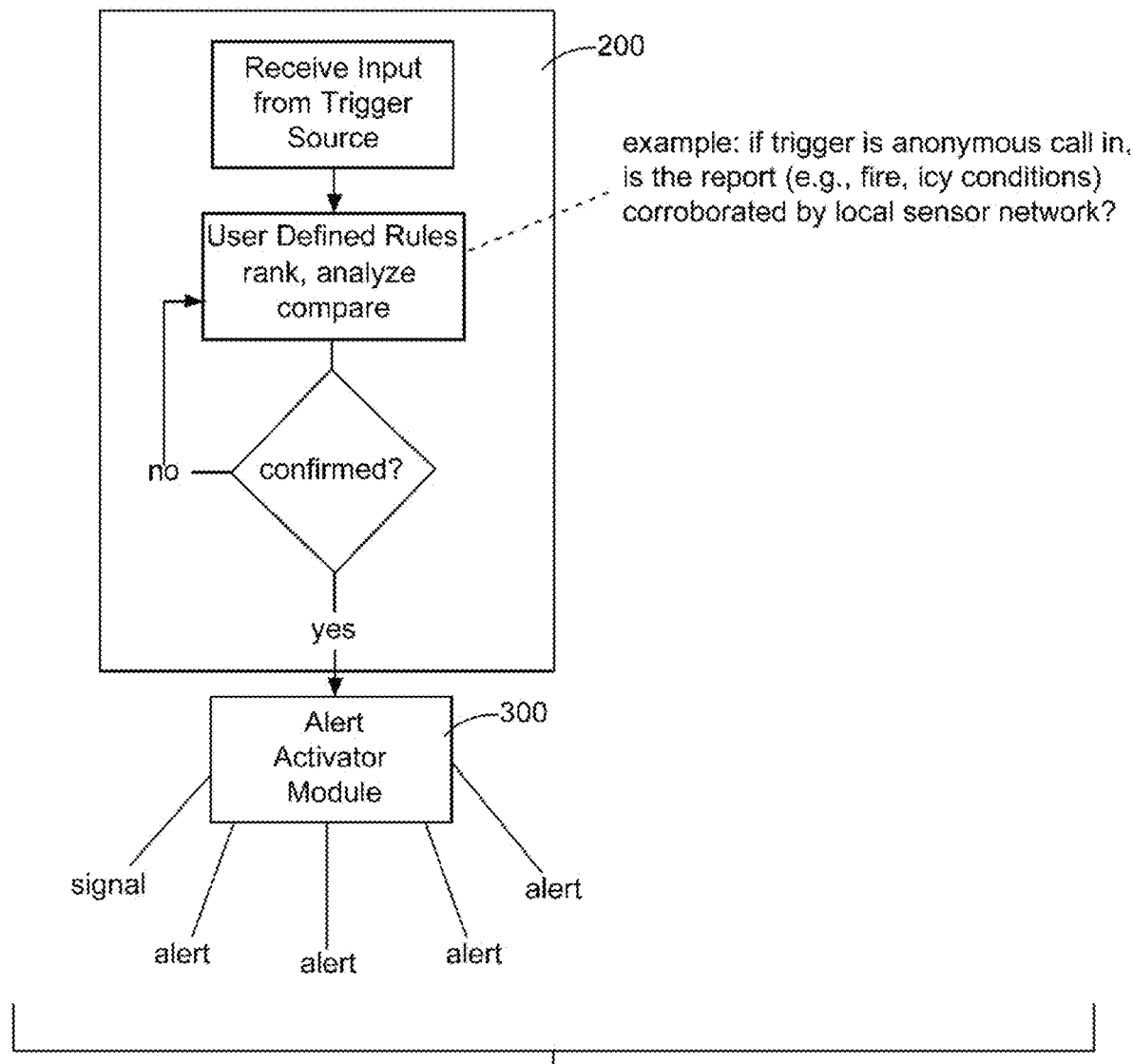
FIG. 9 is a generalized logic flow diagram ending with the activation of a plurality of alerts.
Figure 10:
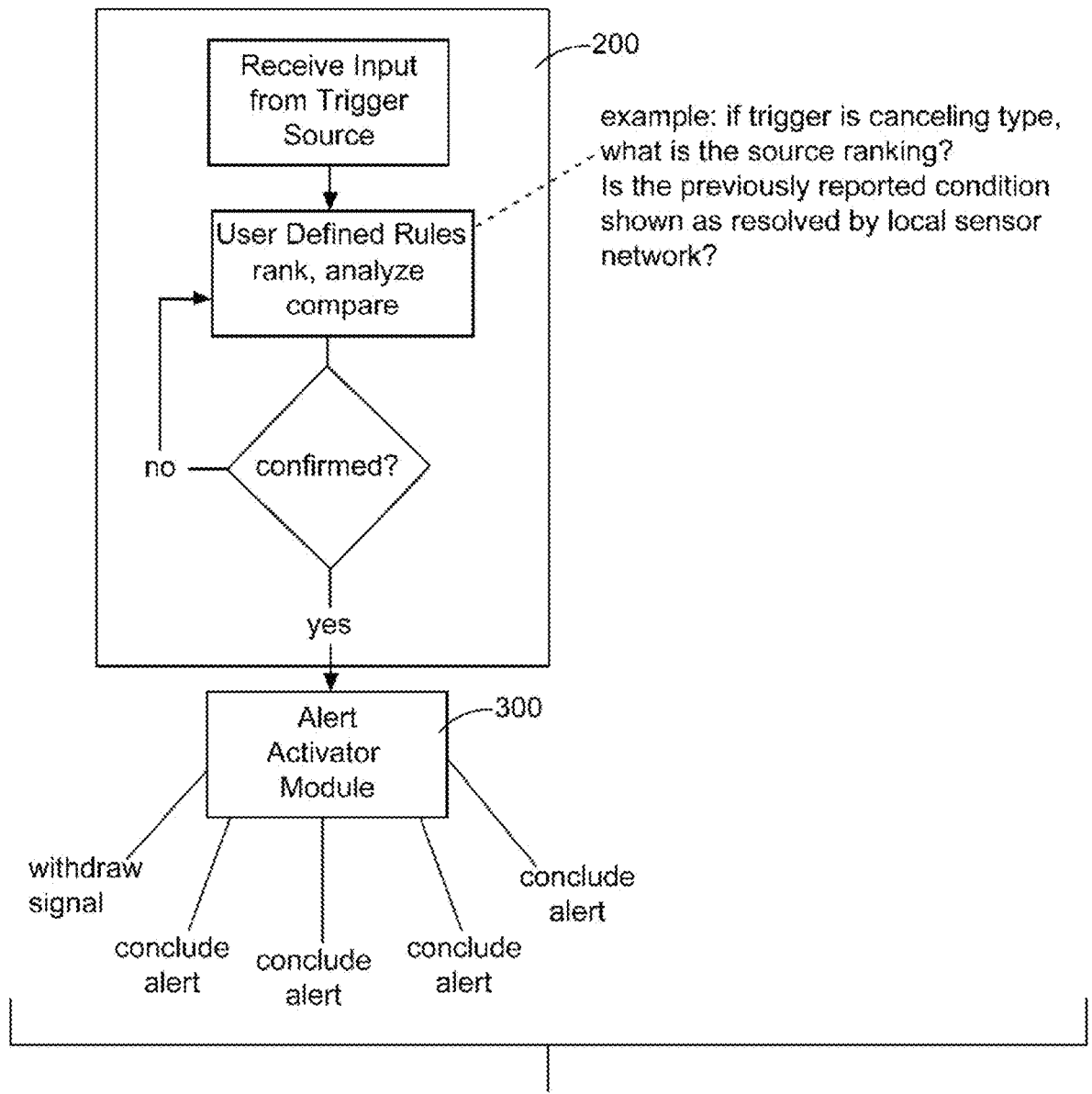
FIG. 10 is a generalized logic flow diagram ending with the deactivation of plural alerts.

FIGS. 9 and 10 in generalized diagrammatic views, show an activation process (FIG. 9) that receives input from a trigger source, whether electronic sensor or human initiated, evaluates the input for corroboration with other sources, and, a deactivation process (FIG. 10) that likewise employs sensor data to conclude the alert.

Figure 11:
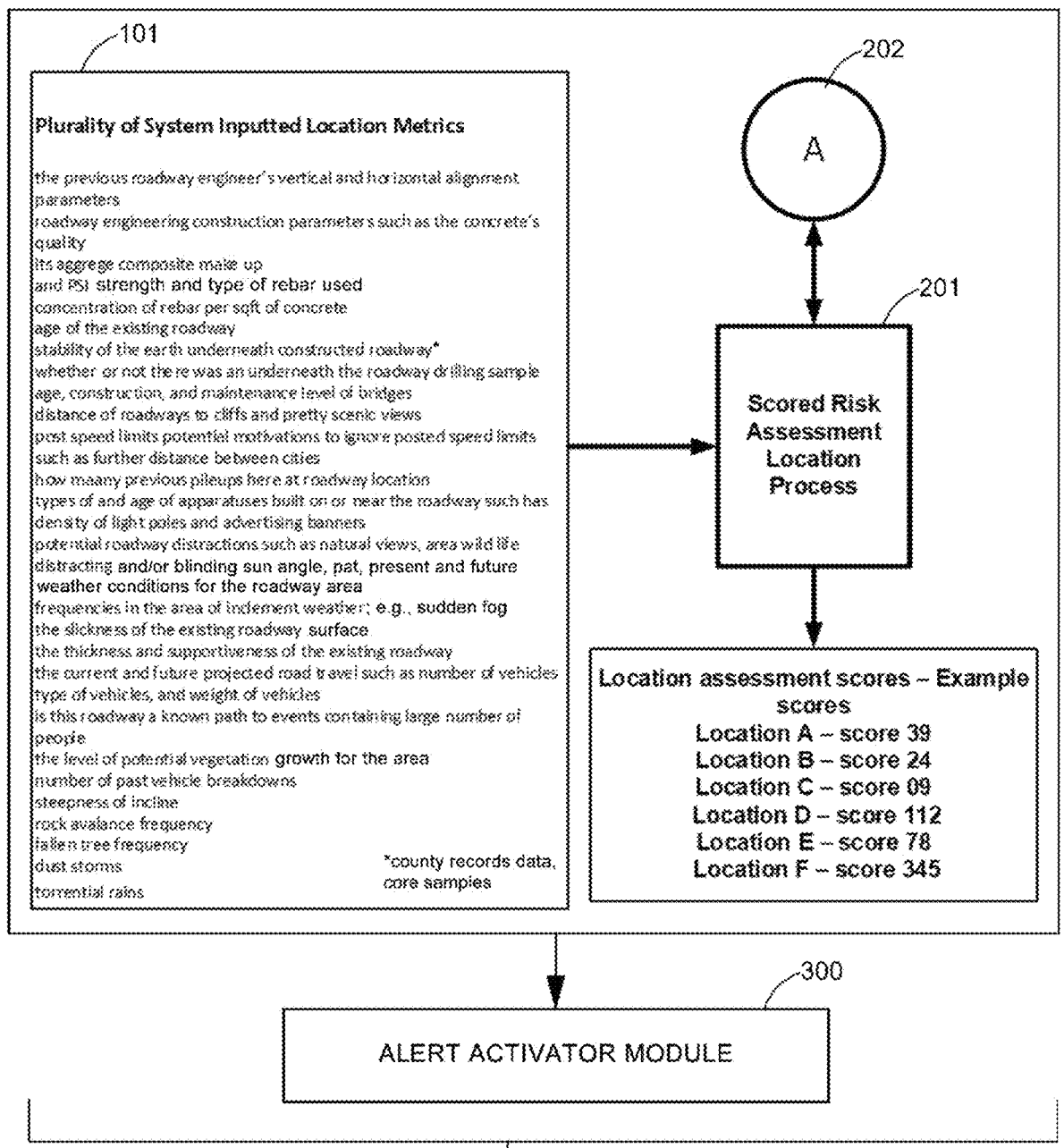
FIG. 11 is a diagram showing various hazard probability metrics indicated by sensor data and ranking the individual locations.

Moving to FIG. 11, a generalized diagram shows a non-limiting list of example various metrics logged and/or reported by various sources which are used by the system to generate a notification response to a hazardous roadway condition. Metrics may be obtained from local sensors, regional sensors, roadway geography, ongoing construction, type of traffic, age and frequency light sources, signage, age and maintenance of bridges, etc. Gathered metrics may be evaluated by an artificial intelligence module using weighting criteria (rules) by an administrative authority in order to quickly generate a risk profile in real time for a given section of roadway, the particular hazard and local response resources. Depending on the risk assessment scoring, a particular response may be selected and deployed for approaching drivers. As an example, depending on the rated severity of the roadway hazard, only message boards (404) may be deployed, message boards plus flashing beacons (406), drone formations (402) or all of the foregoing. Roadway locations selected for system installations can be locations of past vehicle pile-ups, and at risk locations determined by a 'AI Risk Location Assessment Module' based on the module's scored, weighted and calculated risk metrics. The AI Risk Location Assessment Module contains user inputted substantially meaningful list of roadway risk metrics that gauges, scores and prioritizes specific sections of roadway for system installations. The term "substantially meaningful list of roadway risk" as used herein refers to the construction, layout, travel characteristics and environmental factors of a specific section of roadway which are pertinent for predictions of potential roadway pile-ups.

FIGS. 12 and 13, in diagrammatic views, illustrate a developing hazard over time including an example hazard response notification according to various implementations of the present invention. FIG. 12 shows a first section of a roadway with limited sight distance over a rise in the roadway where a two vehicle collision (hazard) has taken place. Camera (102) may typically be mounted atop a beacon capable of flashing, in which case the camera beacon is immediately activated. Camera (102), labeled "Sentinel 1" overlooks a recognized accident prone section of roadway, records the accident in real time and sends a radio transmission to activate roadside beacons at the beacon supporting camera (102) and beacons ($406^1$) ($406^1$) so that all approaching vehicles are alerted. Radio notification, typically cellular, may be made to the local fire department and other appropriate parties. ($d^1$) represents a distance between the on-site camera (102) and a next beacon ($406^1$), while ($d^2$) represents a second distance between beacon ($406^1$) and beacon ($406^2$). Distances (d) and ($d^2$) may vary as well as the total number of beacons. Distances ($d^1$) and ($d^2$) will depend on a number of factors that include sight distance for approaching drivers and the posted speed which determines the average time it takes drivers passing beacon ($406^1$) to arrive at the roadway rise. In the non-limiting example provided, distance ($d^1$) may be 0.10 mile and combined distance may be 0.25 mile. It is intended that drivers are warned in sufficient time as determined by roadway layout/ geography, etc., to slow their approach speed to avoid a pile-up.

While the foregoing beacons are observable generally proximate the roadway approaching a hazard, other automated alerts, typically radio transmissions, can be sent directly to affected parties via public band (306) broadcasting, emergency broadcasting, wireless emergency alerts (307) through cellular networks, telephonic or radio alerts directly to freight companies and chemical transporters (312, 313), hospitals (308), ambulances (302), fire department/hazmat (301), and school transporters (314).

FIGS. 14 and 15 depict implementations including aerial drone (402) deployment wherein the drones fly in programmable formations and display light patterns that represent universal cautionary warnings, e.g., a red triangle or blue triangle (FIG. 6), a line of lighted drones spanning one or more lanes (FIG. 15), an 'X' formation, etc., or more specific warnings, i.e., icy roadway. Drones may fly in formation at a height recognizable by most approaching drivers, and include the advantage of synchronized movement to get the attention of drivers. One or more drones may be stored in an elevated housing/dock, possibly mounted to a beacon along with camera (102) or a base located close to the camera. Drone batteries may be charged by a beacon/pole mounted solar panel. In some implementations, it is possible for one or more drones to slowly fly in the direction of approaching drivers and then turn around and return to a base which may be located close to camera (102). In some implementations one or more drones may fly in lighted formation with attached flashing LEDs or one or more drones may be employed to lift and fly with a lighted sign (e.g., FIG. 27) of any suitable size or shape.

FIG. 16 in a through-windshield view, shows a drone group; e.g., multiple drones flying in blue triangular formation to signal an ice hazard to approaching drivers prior to a view obstructed section of a roadway.

FIG. 17 in a through-windshield view, shows a drone group; e.g., multiple drones fitted with red lights and flying in a row formation to signal a severe roadway hazard to approaching drivers prior to a view obstructed section of a roadway.

FIG. 18 depicts a projection device projecting the word "SLOW" on the roadway prior to the rise in the roadway. Depending on the specific road hazard any suitable message can be projected.

FIG. 19 shows a flashing beacon (406) which can flash one or more colors, alternate colors, alternate blink timing or employ light patterns simulating motion. Such beacons can include a transceiver to receive activation or deactivation by the alert activator module (300).

FIG. 20 depicts a projection device projecting a triangular warning symbol on the roadway prior to the rise in the roadway. Depending on the specific road hazard any suitable message can be projected. This type of projection may be particularly effective on sections of roadway that are well illuminated.

FIG. 21 shows a heads-up display projected on a windshield including a hazard warning and a flashing beacon at the side of a roadway prior to a view obstructed section of a roadway. The heads up display may be transmitted via roadside radio transmitters, or by a local broadcasting service and would be integrated with an onboard OEM or aftermarket heads up display capable of accepting authenticated external safety notifications.

FIG. 22 shows a flashing alphanumeric sign (404) which can flash one or more messages, alternate colors, alternate blink timing or employ light patterns simulating motion. Such signs can include a transceiver to receive activation or deactivation by the alert activator module (300).

FIG. 23 shows an illuminated beacon (406) with multi-directional electronic sirens (408). Electronic sirens are capable of both warning tones and delivering amplified voice messages.

FIG. 24 shows a roadside beacon (406) and transmission of an audible alert message (304, 306) to a car radio of an approaching driver.

FIG. 25 shows a roadside beacon (406), and a wireless emergency alert (307) sent to a cellular device;

FIG. 26 shows a roadside beacon (406), the updating of a smartphone roadway navigation application and the issuance of an audible alert;

FIG. 27 shows a group of drones supporting a lighted sign.

The system's inputs may include but are not limited to: existing and supplementary on-site cameras with object, motion and pattern recognition capabilities capable of ascertaining one or more lanes of roadway has slowed substantially or stopped; emergency system calls from fire trucks, ambulances, and police; wireless cell calls from pedestrians in the area, or others monitoring the area, or radio stations; satellites; highway installed heat, smoke, and fire detectors; existing impact sensors on crash barrels and highway rails; accident reports from drivers' applications; good Samaritan call-ins; notification from vehicle built in or aftermarket accident reporting software; vehicle air bag reporting apps; human triggered on-site manual panic push bottom switch.

The system's transmitted alerts may include but are not limited to: video and audio notification to driver's smart phone application(s); wireless emergency alerts direct to cellular devices; notification to OEM or aftermarket devices installed on vehicles; notification to navigation applications; release of sets of aerial drone in formation such as in the shape of a red or blue warning triangle; activation of bidirectional or 360-degree light intensity panels and audio sirens on existing light poles or beacons on one or both sides of the roadway, on bridges, highway dividers, volunteer buildings or in cooperation with participating land owners; multiple height light panels on existing light poles, on both sides of street; programmable advertising panels; existing tollway or roadway informational panels; warning lights or messages projected down on the roadway; activation of colored lights for specific circumstances such as red for accident, yellow for caution alarm where light color can change from red to fog light yellow orange if foggy conditions, blue warning lights for icy conditions; activation of infrared sensing drones to detect victims or by explosive risk areas from excessive heat; flashing lights and signage; potentially reducing vehicle speed by communication to vehicle governors; activation of warning flares visible to approaching motorists.

Alert recipients may include but are not limited to: local fire and emergency response teams; local ambulances; local hospitals; law enforcement; video & audio alarm to driver's phone app; direct wireless emergency broadcasting to cellular devices in the area; notification transmitted to aftermarket devices installed on vehicles; notification of local utility companies; notification of bus lines not to travel to accident area; notification of local school districts not to send school buses to accident area; notification of freight and chemical shipping lines; notification to local radio stations.

While the invention has been described by the various implementations described herein, it is not intended to limit the scope of the invention to the particular forms set forth. For example, the invention anticipates that vehicle manufacturers may introduce integrated navigational components that may be leveraged by certain implementations according to the present invention. It is conceivable that some heads up displays in vehicles may make use of the previously described cameras and sensors to inform augmented reality windshield displays. Accordingly, the invention is intended to cover such alternatives, modifications, and equivalents as may be included within the spirit and scope of the invention as defined by the following claims.

What is claimed is:

1. An early warning system for vehicles approaching a sight restricted stretch of roadway comprising:
    one or more roadside sensors including a camera with deep neural network object recognition functions;
    one or more alert triggers;
    a master controller that includes one or more microcontrollers and one or more software modules;
    at least one radio transmitter capable of transmitting one or more instructions to one or more recipient-agnostic alerting devices;
    at least one of the recipient-agnostic alerting devices includes a drone formation forming a visible signal to all of the vehicles approaching the sight restricted stretch of roadway.

2. The early warning system according to claim 1, at least one of the one or more recipient-agnostic alerting devices is visible at least 0.25 mile from the one or more targeted areas.

3. The early warning system according to claim 1, at least one of the one or more recipient-agnostic alerting devices is visible within 0.10 mile from the one or more targeted areas.

4. The early warning system according to claim 1, the at least one radio transmitter capable of transmitting to the one or more recipient-specific audible devices.

5. The early warning system according to claim 4, at least one of the one or more recipient-specific alerting devices includes automated telephonic alerts to at least one of the following recipients selected from the following: emergency responders, school districts, truck shipping dispatching.

6. The early warning system according to claim 1, at least one of the one or more recipient-agnostic alerting devices includes automated cellular alerts to cellular devices or updates to smart phone driving applications.

7. The early warning system according to claim 1, at least one of the one or more recipient-agnostic alerting devices includes one or more sirens.

8. The early warning system according to claim 1, at least one of the one or more recipient-agnostic alerting devices includes transmissions made to a radio receiver of an approaching vehicle.

9. The early warning system according to claim 1, at least one of the one or more software modules employs artificial intelligence learning.

10. A method of signaling an early warning to drivers approaching a sight restricted section of a roadway in cases of road hazards, including the steps of:
    providing at least one sensor including a camera with deep neural network object recognition functions installed on are adjacent to a section of roadway;
    directing the camera to a sight restricted section of roadway;
    detecting via the camera, a hazardous condition on the section of roadway;
    providing at least one radio transmitter configured to transmit one or more alerts to one or more recipient-agnostic signaling devices;
    providing at least one other radio transmitter configured to transmit one or more alerts to one or more recipient-specific signaling devices, including one or more aerial drones that are dispatched to fly in formation to warn the drivers approaching the restricted section of a roadway and form aerial warning signals using at least lights and shapes.

11. The method according to claim 10, further comprising the step of installing the one or more recipient-agnostic alerting devices within 0.10 mile from the sight restricted sections.

12. The method according to claim 10, further comprising the step of installing the one or more recipient-agnostic alerting devices at least 0.25 mile from the sight restricted sections.

13. The method according to claim 10, further comprising the step of sending a transmission to the one or more recipient-specific signaling devices wherein the one or more recipient-specific signaling devices are audible.

14. The method according to claim 10, further comprising the step of sending a transmission to an elevated lighted beacon.

15. The method according to claim 10, further comprising the step of sending a wireless emergency alert to a mobile device.

* * * * *